Patented Aug. 11, 1931

1,818,839

UNITED STATES PATENT OFFICE

GEORGE FREDERICK BRINDLEY, OF NEW YORK, N. Y., ASSIGNOR TO METAL CHLORIDES CORPORATION, A CORPORATION OF DELAWARE

PROCESS FOR MANUFACTURING ANHYDROUS ALUMINUM CHLORIDE

No Drawing.   Application filed September 22, 1927.  Serial No. 221,406.

The primary object of the present invention is to improve and simplify the production of anhydrous aluminum chloride so as to reduce the cost of the process of manufacture of this chemical. A further purpose of the invention is to produce this chloride with staple materials which can be readily obtained in the market at relatively low initial cost or which lend themselves readily to recoveries which will offset their costs. It is in general the objective to make anhydrous aluminum chloride available industrially in a number of important fields where the same could be employed, or employed more extensively, if the same were available at a price materially lower than the market prices current at present.

The recent discoveries of its value in a number of industrial processes has made it highly desirable to find a method involving cheap materials and inexpensive, convenient methods of production. Much work has been done by chemists to attain this end, but up to the present time no completely successful methods have been disclosed.

Aluminum chloride it appears, was first produced by Oersted, by passing a current of dry chlorine gas over a heated mixture of carbon and alumina. This method was also later used and improved by others. A summary of the known methods of production has been published by Ralston as follows: dry chlorine or dry hydrochloric acid gas acting on aluminum metal, or on aluminum carbide; chlorine gas acting on mixtures of aluminiferous and carbonaceous materials; chlorine gas acting on aluminum nitride; chlorine gas and carbon disulphide vapor on aluminiferous materials; chlorine compounds of carbon or of sulphur on aluminiferous materials; dry lead chloride reacting with aluminum metal or with aluminum carbide; and anhydrous calcium chloride with aluminiferous materials.

The current and known methods of producing anhydrous aluminum chloride above set forth, are relatively troublesome and expensive, especially those in which chlorine gas is used. Nor has any decided advantage resulted from those relying upon reactions between various chlorides and the various aluminiferous materials which have been hitherto employed for industrial production. Chlorides of calcium or of sodium, if directly available, would of course furnish the cheapest and most convenient source of the chlorine for the purpose, but no satisfactory process of employing them in this connection has been found hitherto.

My invention involves the use of aluminum sulphate, preferably in anhydrous form, or under conditions whereunder it will be readily made anhydrous, and causing the same to react with certain suitable chlorides. While aluminum sulphate is not as cheap as the aluminiferous materials which have been employed in other processes, it offers compensating advantages as to the other factors of production, so that the net result as to cost and simplicity is decidedly advantageous.

In view of the industrial and economic limitations, it is necessary to confine ourselves to such materials as are conveniently available in large quantities and at a suitable price, and will readily react directly with each other without undue elaboration of process and/or plant.

Ordinarily it would readily suggest itself to resort to a reaction between some chloride and a salt of aluminum. But the special physical properties of the available chlorides and aluminum salts do not readily lend themselves to such a reaction, because of the requirement to produce an anhydrous salt. The ordinary methods of bringing the reagents together in solution is therefore out of the question, and yet the reaction will not proceed if the aluminum salt and the chloride are merely brought together in the solid form.

The process for producing the anhydrous chloride which is the subject of this invention is to bring the chloride into sufficiently intimate contact with the aluminum salt to permit the reaction to proceed by resorting to fusion of the chloride or a mixture of chloride, as will further appear.

It occurred to me that aluminum sulphate might well serve as the aluminiferous material for the purpose of a reaction with a chloride, especially if calcium chloride were used. But aluminum sulphate, while readily lending itself to reaction with various chlorides, cannot be caused to react by the wet process under the conditions of the problem. I therefore concluded, that I could perhaps employ the method of liquefying the chloride by fusion, and found that when a suitable chloride was selected that the reaction proceeded satisfactorily. But the chlorides which can be used advantageously for the purpose of such a reaction with aluminum sulphate are limited, as most of the commercially and economically available chlorides fuse at relatively high temperatures and therefore are not immediately and straightway available for such a fusion process, as will further appear.

As aluminum sulphate decomposes at a relatively low temperature, to wit, 690° C., the chloride which will be suitable for inducing the reaction must fuse at a temperature substantially lower than this to make it suitable for the desired reaction. The chief metal chlorides which fall within the scope of the process are:—lead chloride, which has been previously employed for reacting with aluminum carbide, and which fuses at 501° C.; stannous chloride, fusing at 247° C.; cuprous chloride, at 422° C.; ferric chloride, at 298° C.; and zinc chloride at 365° C. In general they are all available for reaction with aluminum sulphate. Some of these lend themselves more especially to the purpose over the others, either because they fuse at a lower, more favorable temperature or because they are readily available in the market at satisfactory prices, or because they permit recovery of metal or sulphates or chlorides which will themselves find a ready market, or because they are easily recoverable in a form so that they may again be used in the process. After weighing all relative advantages and disadvantages, with respect to availability, convenience of operation, first cost, recoveries, etc., I am led to prefer the use of zinc chloride, among the available metallic chlorides, for the reasons which will more fully appear hereafter.

However, not only this group of metal chlorides are available, but the reaction with aluminum sulphate can also be carried through, by the fusion method, with alkali metal chloride under proper condition. Neither sodium chloride, nor calcium are however available, in their individual form, because their melting point lies above the decomposition point of our aluminum sulphate. For instance, sodium chloride fuses at 800° C. and calcium chloride at 770° C. But aluminum sulphate decomposes at a temperature of 690° C. Instead of obtaining aluminum chloride in any form, the sulphate, when subjected to the temperatures of these molten chlorides, would decompose into alumina, and sulphur trioxide fumes would escape. This seemed to be a serious obstacle to the use of these cheap and plentiful alkali metal salts, but this was overcome by taking advantage of the well known fact that many substances when mixed will fuse at a much lower temperature than either one of the ingredients of such a mixture.

In one form of the application of the principle of the present invention I mixed approximately equal quantities of sodium chloride and calcium chloride which can be readily fused at a temperature of say, substantially 600° C. It is not particularly essential that respective quantities of sodium chloride and calcium chloride be taken in any fixed ratio. Presumably a eutectic mixture would be theoretically the best, in view of the object to reduce the fusion temperature, but it will be obvious that a wide latitude as to proportions is permissible, so long as the melting point of the chloriniferous compound is below the decomposition point of the aluminum salt. When such a mixture of sodium chloride and calcium chloride has been heated to the melting point it is allowed to react with the anhydrous aluminum sulphate in powder, or small lump form. The reaction begins at once and can be positively controlled by regulating the rate at which the aluminum and the chlorides are brought into contact.

When the mixture for the chloride bath comprises sodium chloride and calcium chloride, as above described, it appears that the reaction takes place between calcium chloride and aluminum sulphate, and that the sodium chloride either does not enter into the reaction, or at any rate but to a very small degree. The sodium chloride, in this adaptation of my process, has principally the function of reducing the fusing point of the calcium chloride without interfering with the major purpose of the process and reaction.

Another application of the same principle, of reacting upon aluminum sulphate with a fused chloride mixture, consists of mixing the chloride, such as sodium chloride with some other kind of salt, such as sodium sulphate. In that case, of course, the sodium chloride is the active chloridizing agent of the mixture, and the sodium sulphate merely acts as the adjuvant for reducing the fusing point of the sodium chloride. In this adaptation, sodium sulphate is preferably used because the reaction of the $Al_2(SO_4)_3$ with the NaCl also produces sodium sulphate and thus sodium sulphate is left after the reaction is completed.

Other chlorides, notably certain metallic chlorides, which fuse at temperatures below the decomposition point of the aluminum sulphate, may, as indicated, also be employed to advantage, bearing in mind of course, always, that the cost of materials is an important factor in the choice of the chloride, and this involves the consideration or recoveries to be effected. Thus zinc chloride for instance, may be satisfactorily employed, even though this is relatively expensive in its first cost. I have found that with zinc chloride, the process of reacting with anhydrous aluminum sulphate can be developed cyclically with the periodical recovery of zinc as sulphate and its ultimate reconversion into chloride. This can then again be used in the primary operation, thus overcoming the relatively high first cost of the zinc salt.

To describe in further detail the main feature of the processes employed and some modifications thereof falling within the scope of this invention, I present the following examples by way of illustration which however, can be modified considerably, without departing from its spirit and scope, in the detail of the manner of its application.

*Example I:—Sodium chloride and calcium chloride.*—Approximately equal individual parts of sodium chloride and of calcium chloride are mixed. These are fused and heated long enough to drive off all water. The thoroughly fused mixture of these two salts is then poured upon one equal individual part of anhydrous aluminum sulphate, calculated for the theoretical equivalent of the calcium chloride put into process. The $AlCl_3$ fumes are made to pass into and through a condenser connected with the receptacle for collecting the condensed chloride.

*Example II:—Sodium chloride and calcium chloride, Modified.*—Approximately equal parts of sodium chloride and calcium chloride are fused, as illustrated in Example I, in a heating pot having an opening at the bottom to permit the molten mass to discharge upon the aluminum sulphate in a closed reaction chamber below connected with a condenser to collect the aluminum chloride fumes as they rise from the reaction mass. The reaction chamber is provided with an opening connected with a hopper for continuously feeding fresh quantities of anhydrous aluminum sulphate into one side of the bottom of the chamber and with an opening at the opposite side for the discharge of the resulting mixture of sodium chloride and calcium sulphate. The quantity of aluminum sulphate so fed into the reaction chamber is controlled to equal the chemically equivalent quantity of molten calcium chloride received from the melting pot. Approximately equal quantities of sodium chloride and calcium chloride are added to the melting pot as the reaction proceeds to replace the quantities discharged into the reaction chamber. A ribbon conveyer forces the exhausted mixture of chloride and sulphate through the discharge opening.

*Example III:—Sodium chloride and Glauber's salt.*—A thorough mixture is made of 340 parts of anhydrous aluminum sulphate, 360 parts of sodium chloride, and substantially 600 parts of Glauber's salts. This mixture is first heated slowly to a low temperature, approximately 33° C., sufficient to make the three ingredients coalesce into an intimate mass. After the materials have fully coalesced, the heat is very gradually increased to approximately 130° C., so as to drive off all of the water of crystallization. This temperature is maintained until no more water comes off, and until the mixture is thoroughly anhydrous. The heat is then increased to the point of incipient fusion, approximately 600° C., care being taken however, not to exceed 690° C., the decomposition point of the aluminum sulphate. As soon as the mass begins to fuse, the $AlCl_3$ begins to form and the fumes are carried to the condenser and collected by the usual means.

The function of the Glauber's salts in the foregoing example is merely that of an adjuvant and to help to bring the fusion point of the sodium chloride down in accordance with the principle previously described. While anhydrous sodium sulphate may also be used to replace the calcium chloride, as exemplified in the previous examples, I have found that the hydrous sulphate may be used to advantage, according to local conditions. The water of crystallization does not affect the result of the reaction unfavorably as might be supposed. On the contrary, when using Glauber's salts, this sulphate dissolves in its own water of crystallization at such a low temperature that the mass begins to coalesce before any reaction is manifested. Under maintenance of this low temperature the mixture rapidly becomes dehydrated, but during the coalescence stage the ingredients have become so intimately associated with each other, that when the temperature is finally raised to the point of fusion of the mixture, the desired reaction between the chloride and the aluminum salt follows as if anhydrous materials had been used exclusively. The quantity of NaCl may be used in appreciable excess, for, while the reaction with this mixture converts sodium chloride into sodium sulphate, the excess of sodium chloride in the by-product can be easily separated from sulphate, because neither of them is soluble in a saturated solution of the other.

*Example IV:—Zinc chloride.*—Zinc chloride, 136 parts, is fused at about 370° C. and caused to react with 342 parts of anhydrous aluminum sulphate. The resulting fumes of aluminum chloride are collected, condensed and disposed of as before.

The reaction between the zinc chloride and anhydrous aluminum sulphate takes place quantitatively, and therefore no excess of zinc chloride is required. The reaction produces zinc sulphate. This is readily reconverted into zinc chloride by causing it to react at a temperature above 730° C., with either sodium chloride or calcium chloride, when the zinc will distill off as chloride. The zinc chloride thus obtained is then used again for the reaction with anhydrous aluminum sulphate as described in Example IV. If sodium chloride is used in this secondary reaction for the recovery of zinc chloride; then sodium sulphate is produced. Any sodium chloride present in such sulphate due to any excess used, can be readily separated from the latter by the means elsewhere herein referred to.

*Example V:—Zinc chloride and sodium chloride.*—This is a modification of the adaptation illustrated in Example IV, in which sodium chloride to the extent of 117 parts is added to 136 parts of $ZnCl_2$ and the mass fused and allowed to react with the aluminum sulphate as before.

The admixture of the sodium chloride in this adaptation facilitates the dehydration of the zinc chloride before the reaction takes place, and can thus be advantageously used at once in the primary reaction. The by-product will be zinc sulphate plus sodium chloride which mixture can then be reconverted by distilling off the zinc in form of chloride by heating to above 730° C. as before described.

It is obvious that considerable variation can be made in modifying of steps of the process without departing from the scope and spirit of the present invention, particularly with respect to quantity, except that as pointed out, the essential chloride in mixtures, when such are used, should be present in at least sufficient quantities to satisfy the theoretical amount necessary to treat the quantity of aluminum sulphate put into process. Obviously also the quantity of the adjuvant salt in mixtures must be more closely controlled when it is desired to obtain the resulting by-product, as sodium sulphate for instance, in a more or less pure state. Otherwise it may be desirable to use eutectic mixtures. But eutectic proportions are not essential to the processes, because, generally the practical quantities which may suggest themselves for the attainment of one or another special objective, will nevertheless meet the desired primary purpose of materially reducing the fusion point below the necessary limit to avoid decomposition of the aluminum sulphate.

When operating with the zinc chloride it is necessary to adhere to the theoretical quantity so that the resulting aluminum chloride and zinc sulphate will more nearly balance if the latter is sought as the by-product.

The choice of the particular chlorides for the process naturally must be dependent upon local and temporal conditions as to supplies, the market for or utility of the resulting by-product, changing conditions, etc. But here again, general conditions and the convenience of practical procedure make it desirable to use such chlorides as will fuse at such relatively low temperatures so as to afford an ample and safe margin of difference between the decomposition point of the aluminum salt and the fusion point of the chloride or of the mixture containing the effective chloride.

What I claim as new and for which I request the issuance of Letters Patent is as follows:—

1. The process of manufacturing anhydrous aluminum chloride involving a mixture of sodium chloride and calcium chloride, heating the same to the melting point of such mixture; allowing the fused mass to react with anhydrous aluminum sulphate; collecting the fumes of aluminum chloride resulting from the interaction of the said chloride mixture and aluminum sulphate and condensing the same.

2. The process of manufacturing anhydrous aluminum chloride involving the treatment of anhydrous aluminum sulphate with a mixture of fused chlorides, which mixture will fuse at a temperature lower than the fusion point of the individual chlorides used and at a temperature below the decomposition point of the aluminum sulphate.

3. In a process for producing anhydrous aluminum chloride, the reaction between anhydrous aluminum sulphate and a chloride in a fused state at a temperature substantially lower than 690° C.

4. The process of causing a salt of aluminum, which will react with a given chloride in solution, to react with such a chloride in a fused state, the said chloride being present in a mixture of salts which will fuse at a temperature below the decomposition point of the said aluminum salt.

5. In a process for producing anhydrous aluminum chloride, the reaction between anhydrous aluminum sulphate and chloride material which fuses below 690°

GEORGE FREDERICK BRINDLEY.